US007941427B2

(12) United States Patent
Barsness et al.

(10) Patent No.: US 7,941,427 B2
(45) Date of Patent: May 10, 2011

(54) DYNAMICALLY MANAGING COMPUTER RESOURCES BASED ON VALUATIONS OF WORK ITEMS BEING PROCESSED

(75) Inventors: Eric Lawrence Barsness, Pine Island, MN (US); Douglas David Jans, Rochester, MN (US); Randy William Ruhlow, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1248 days.

(21) Appl. No.: 10/824,054

(22) Filed: Apr. 14, 2004

(65) Prior Publication Data
US 2005/0234935 A1 Oct. 20, 2005

(51) Int. Cl.
*G06F 17/30* (2006.01)
(52) U.S. Cl. ........ 707/720; 705/500; 709/226; 718/100; 718/108
(58) Field of Classification Search .................. 707/9.5, 707/100, 720; 705/9, 400; 709/226; 718/100, 718/108
See application file for complete search history.

(56) References Cited

U.S. PATENT DOCUMENTS

| | | | | |
|---|---|---|---|---|
| 5,963,911 A * | 10/1999 | Walker et al. | | 705/7 |
| 6,321,373 B1 * | 11/2001 | Ekanadham et al. | | 717/119 |
| 6,725,227 B1 | 4/2004 | Li | | |
| 6,757,897 B1 * | 6/2004 | Shi et al. | | 718/102 |
| 6,957,431 B2 * | 10/2005 | Bollella et al. | | 718/100 |
| 7,003,475 B1 * | 2/2006 | Friedland et al. | | 705/9 |
| 7,020,619 B2 * | 3/2006 | Thompson | | 705/8 |
| 7,188,174 B2 * | 3/2007 | Rolia et al. | | 709/226 |
| 7,386,465 B1 * | 6/2008 | Friedland et al. | | 705/9 |
| 2002/0002578 A1 * | 1/2002 | Yamashita | | 709/105 |
| 2002/0065864 A1 * | 5/2002 | Hartsell et al. | | 709/100 |
| 2002/0091612 A1 * | 7/2002 | Greene et al. | | 705/37 |
| 2002/0120486 A1 * | 8/2002 | Thompson | | 705/9 |
| 2002/0138542 A1 * | 9/2002 | Bollella et al. | | 709/102 |
| 2003/0158884 A1 * | 8/2003 | Alford, Jr. | | 709/104 |
| 2003/0225644 A1 * | 12/2003 | Casati et al. | | 705/35 |
| 2004/0093254 A1 * | 5/2004 | Hirata et al. | | 705/8 |
| 2004/0205206 A1 * | 10/2004 | Naik et al. | | 709/230 |
| 2004/0221038 A1 * | 11/2004 | Clarke et al. | | 709/226 |
| 2005/0015504 A1 * | 1/2005 | Dorne et al. | | 709/229 |
| 2005/0114274 A1 * | 5/2005 | Dube et al. | | 705/400 |
| 2005/0198636 A1 * | 9/2005 | Barsness et al. | | 718/100 |

OTHER PUBLICATIONS

Buyya et al. "A Deadline and Budget Constrained Cost time Optimisation Algorithm for Scheduling task Farming Applications on Global Grids", School of computer Science and Software Engineerring, Monash University, Caulfield Campus, Melbourne, Australia, 2002. (http://www.csse.monash.edu.au/~davida/papers/pdpta02.pdf).*
Dettinger et al., U.S. Appl. No. 10/083,075, filed Feb. 26, 2002, "Improved Application Portability and Extensibility Through Database Schema and Query Abstraction".

(Continued)

*Primary Examiner* — Etienne P LeRoux
*Assistant Examiner* — Cindy Nguyen
(74) *Attorney, Agent, or Firm* — Roy W. Truelson

(57) ABSTRACT

A computer-implemented method, system and computer product including a scheduling manager residing in memory; whereby the scheduling manager dynamically manages access of additional computer resources to be applied to work items of a program based on their valuations relative to the processing costs thereof.

24 Claims, 8 Drawing Sheets

OTHER PUBLICATIONS

Dettinger et al., U.S. Appl. No. 10/403,366, filed Mar. 31, 2003, "Modification of a Data Repository Based on an Abstract Data Representation".

Dettinger et al., U.S. Appl. No. 10/403,960, filed Mar. 31, 2003, "Sequenced Modification of Multiple Entities Based on an Abstract Data Representation".

Dettinger et al., U.S. Appl. No. 10/132,228, filed Apr. 25, 2002, "Dynamic End User Specific Customization of an Application's Physical Data Layer Through a Data Repository Abstraction Layer".

Dettinger et al., U.S. Appl. No. 10/131,984, filed Apr. 25, 2002, "Remote Data Access and Integration of Distributed Data Sources Through Data Schema and Query Abstraction".

Dettinger et al., U.S. Appl. No. 10/403,356, filed Mar. 31, 2003, "Dealing With Composite Data Through Data Model Entities".

Chase, Jeffrey S. et al., "Managing Energy and Server Resources in Hosting Centers", ACM SIGOPS Operating Systems Review, Dec. 2001, 14 pgs., vol. 35, Issue 5, ACM Press, New York, NY, USA.

R. Buyya, "Economic-based Distributed Resource Management and Scheduling for Grid Computing", (Ph.D. Thesis, Monash University, Apr. 2002, pp. 1-178.

* cited by examiner

700

Work item list

| Work Item ID | Computing Resource Estimate | Cost to Process | Valuation | Cut-off Date |
|---|---|---|---|---|
| 4 | 10 units | $100 | $1000 | 02/18/2004 |
| 1 | 3 units | $30 | $200 | 02/15/2004 |
| 8 | 7 units | $70 | $175 | 02/23/2004 |
| 2 | 2 units | $20 | $50 | 02/15/2004 |
| 5 | 5 units | $50 | $75 | 02/20/2004 |
| 3 | 1 unit | $10 | $24 | 02/17/2004 |
| 9 | 1 unit | $10 | $18 | 02/23/2004 |
| 6 | 1 unit | $10 | $17 | 02/20/2004 |
| 7 | 3 units | $30 | $28 | 02/22/2004 |
| 10 | 7 units | $70 | $60 | 02/23/2004 |

In house process list

Contract out process list

Delay list

DYNAMICALLY MANAGING COMPUTER RESOURCES BASED ON VALUATIONS OF WORK ITEMS BEING PROCESSED

BACKGROUND OF THE INVENTION

The present invention relates generally to managing computer resources. More particularly, it relates to methods, systems, and computer program products for dynamically managing access to additional computer resources based on a determination of when it makes economic sense to pay for such additional resources.

In today's economic environment, businesses are increasingly examining their expenditures in terms of purchasing appropriate computer capacity/resources to meet their fluctuating business needs. Current computer systems allow consumers to balance the cost of the computer hardware with fluctuating demands placed on computer resources. For example, in most networked computer systems, computing demands fluctuate between relatively low and high values. If a company purchases a computer system that is capable of meeting peak demands, much of the capacity of the computer system will go unused during non-peak times. In addition, purchasing capacity to meet peak demand is relatively costly. If a company purchases a computer system that is capable of meeting average demand, the cost is lower, however, but the performance of the computer system suffers during peak times.

One known approach allows a computer user to buy a computer system having some resources installed, but initially disabled. When the customer determines that more capacity is needed, the customer may enter into an arrangement with the provider of the computer system to enable certain additional resources for a fixed period of time. Such an approach works out particularly well for companies having seasonal peaks in workload demands. Alternatively, companies may purchase a computer system at a reasonable cost that has the capability of providing enhanced computing power during the peak season. For example, in the case of batch processing of insurance claims in the health care industry, customers may buy a computer that has sufficient capacity to process all of their claims overnight. In a grid computing environment, a customer may have a set amount of computing power available as before, but may also send out requests for some additional available capacity from the grid for a price when it is needed. However, currently customers are not able to dynamically make appropriate decisions as to when it makes sense to pay for additional computing power, such as when sending out requests to a grid environment.

Presently, there are no known approaches for dynamically managing access to additional computer resources based on valuations of the work items being processed. Moreover, there are no known approaches for dynamically allocating computer resources based on determinations as to whether the valuations of predefined or contracted costs of processing for each one of the work items exceeds a corresponding estimated cost to process each work item. Hence, there are needs for methods, systems, and computer program products for, among other reasons, dynamically managing access to additional capacity based on a determination of when it makes economic sense to pay for additional capacity. More specifically, there are needs for dynamically managing access to additional computer resources based on determining if valuations of the work items being processed exceed the estimated costs to process such work items. Without such needs being satisfied, the true potential of managing the allocation of computer resources will not be easily achieved.

SUMMARY OF THE INVENTION

The present invention provides enhanced methods, systems, and computer program products for dynamically managing the allocation of computer resources based on a determination of when it makes economic sense to pay for additional computer resources without negative effect and that overcome many of the disadvantages of the prior art.

The present invention provides enhanced methods, systems, and computer program products for dynamically managing the access to additional computer resources based on determining if valuations of each of the work items being processed exceed the estimated costs to process such work items.

In an illustrated embodiment, dynamic management is met by determining whether each of the work items may be delayed until it can be processed without access to additional resources.

In an illustrated embodiment, access to additional computer resources is dynamically managed based on processing priorities that are related to financial valuations of the work items.

In an illustrated embodiment, dynamic management of access to additional resources is effected by providing users with more flexibility to such resources.

It is, therefore, an aspect of the invention to provide methods, systems, and computer products that determine a determination of when it makes economic sense to pay for additional computer resources.

It is yet another aspect of the invention to provide an invention as described above in which the financial benefit or valuations of processing work items to the costs of processing such work items are compared in order to determine if the work items should have access to additional computing capacity.

The above and other features and aspects of the present invention will be more fully understood from the following detailed description of the preferred embodiments, which should be read in light of the accompanying drawings. It should be understood that both the foregoing generalized description and the following detailed description are exemplary, and are not restrictive of the invention.

BRIEF DESCRIPTION OF THE DRAWINGS

FIGS. 7A-7D are depictions of different lists that are generated and utilized in performing the steps of the present invention.

DETAILED DESCRIPTION

The present invention provides enhanced methods, systems, and computer program products for dynamically managing the allocation of computer resources based on a determination of when it makes economic sense to pay for additional computer resources.

Figure 1:
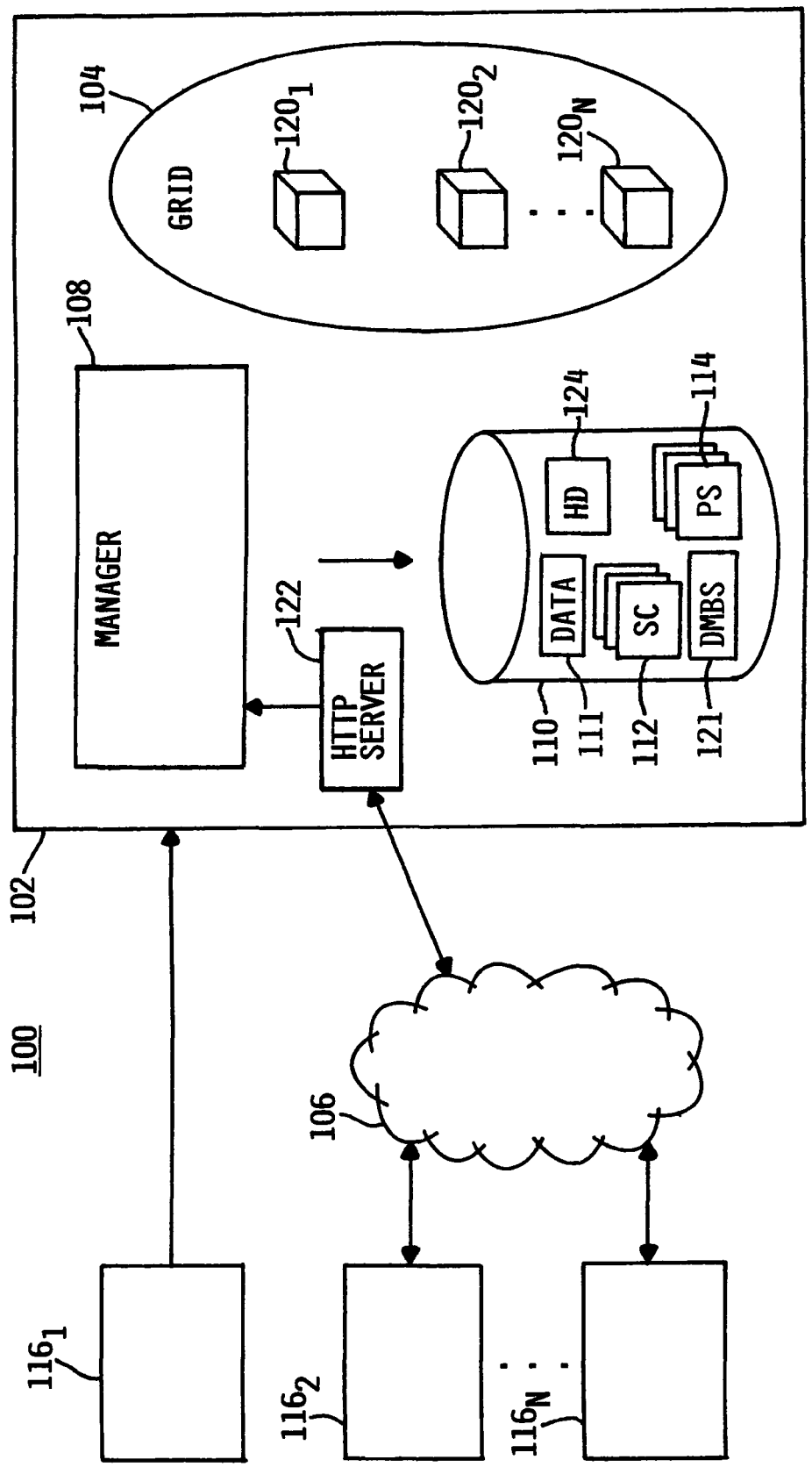
FIG. 1 is a block diagram of a data processing environment having a provider of computing services through a grid environment, in accordance with the present invention.

Referring now to FIG. 1, a data processing environment 100 is illustrated in which the present invention is practiced. Generally, the data processing environment 100 includes a provider computer system 102 and a plurality of one or more computer systems $116_1$-$116_N$ (collectively 116). The provider computer system 102 is illustratively embodied as a server computer with respect to the system users' (client) computer systems 116. Although all computers are illustrated as singular entities, in practice the provider computer system 102 and the client computer systems 116 may all be a network of computers configured to perform various functions, including those described herein. Further, the terms "client" and "server" are utilized merely for convenience and not by way of limitation. As such, the users' computer systems 116, which may be clients relative to the provider computer system 102, in some regards, may themselves be servers relative to one or more other clients (not shown).

The provider computer system 102 and the computer systems 116 communicate through a network 106. The provider computer system 102 provides access to a grid computing environment 104. Access to various resources within the grid computing environment may also be provided by different service providers (not shown). The grid environment 104 may contain a plurality of different computing resources $120_1$-$120_N$ (collectively 120). The grid computing environment 104 may include parallel and distributed computing systems that enable sharing, selection, and aggregation of geographically distributed resources at runtime depending on their availability, capability, performance, cost, and/or user's quality of service requirements. The grid computing environment 104 may be a network including diverse hardware and/or software computing resources. These resources may be available and accessible through a network medium such as, the Internet, to a wide variety of users and may be shared between them.

In an exemplary embodiment, the network 106 may be any one of several suitable through which information may be transferred, such as, a local area network (LAN), or a wide area network (WAN), or the like. The provider computer system 102 may be configured with a hypertext transfer protocol (HTTP) server 122 for servicing requests from browser programs residing on the computer systems 116. The HTTP server 122 and the browser programs provide convenient and well-known software components for establishing a network connection (e.g., a TCP/IP connection) via the network 106. The network may include portions of a web services environment.

Referring back to the provider computer system 102, it may be configured with a manager 108 that requests grid resources for the computer systems 116. In an exemplary embodiment, the manager 108 manages routing requests from the computer systems 116 to the appropriate resources of the grid computing. Such a grid computing system is described in co pending and commonly assigned patent application Ser. No. 10/659,976 filed on May 2, 2003, and is incorporated herein by reference and made a part hereof. Some of the requests are fulfilled on a fixed fee basis or a fee basis dependent on at least a parameter (e.g., time) whereby fees are charged dependant on the time needed to process, for example a batch program request and/or return a response. The manager 108 also monitors progress of the requests by keeping track of time spent on a particular request and calculating an estimated cost of processing. Although, the manager 108 is shown as a single entity, it should be noted that it may be representative of different functions implemented by different software and/or hardware components within the provider computer system 102. The pricing of the processing costs is determined with respect to any variety of pricing criteria including, for example, time-based criteria, request-type or class criteria, priority criteria, historical information, system user identification criteria, and combinations thereof. These pricing criteria are applied to define pricing schedules that the manager 108 may access to calculate a cost for a request. In one embodiment, pricing criteria is defined in service contracts 112 stored in a database 110. The database may utilize a database management system (DBMS) 121, such as DB2™, that is commercially available from International Business Machines Corporation, Armonk, N.Y. The database 110 may also contain historical data (HD) 124 that include a log of requests received and processed in the past, with the corresponding amount of resources utilized and the time taken to process various aspects of the programs. A service contract (SC) may exist for each contractual system user of the provider computer system 102 (i.e., each system user with whom the provider computer system 102 has entered into a legal agreement). In another embodiment, pricing criteria may be specified in generic pricing schedules (PS) 114 for system users who do not have contractual agreements with the service provider. Different generic pricing schedules 114 may exist for a variety of different pricing criteria including those mentioned above (e.g., request-time criteria, request-type or class criteria, priority criteria, historical information, system user identification criteria, and combinations thereof).

Historical information may also serve as criteria for determining pricing and resource allocation schedules as will be described. Pricing schedules may exist that take into account a combination of the one or more pricing and resource allocation criteria. The historical information may be supplied by the historical data 124 which includes information about the amount of resources and time taken to process a request in the past. The historical data 124 may be searched to determine whether a similar or same request as the request received has been processed in the past. If a similar request is located in the historical data, the information about resources utilized, time and costs taken to process the request may be utilized to select a different pricing schedule. Of course, each of the criteria mentioned above are optional, and may or may not be utilized in determining pricing and resource allocation schedules, in different embodiments.

Figure 2:
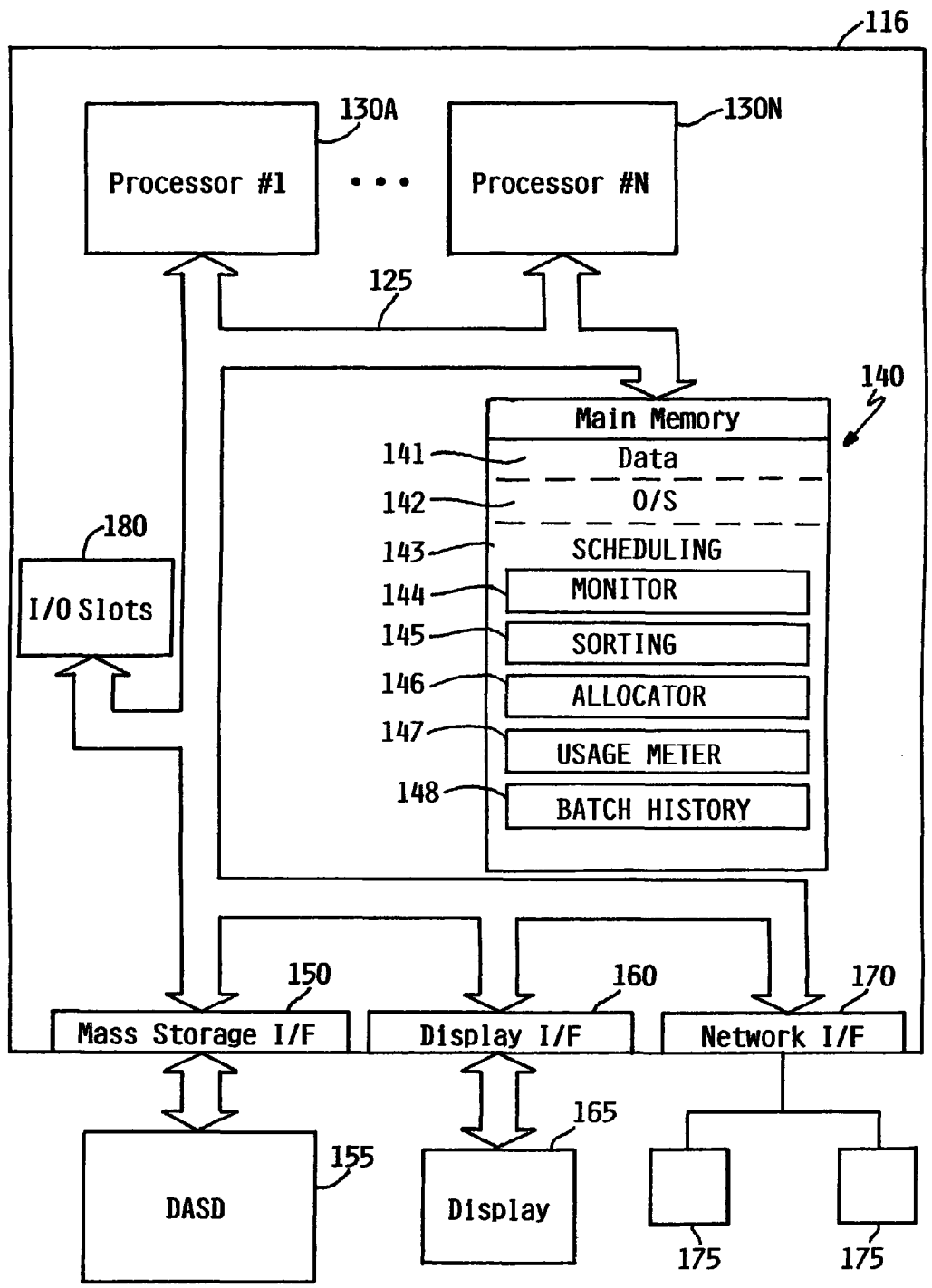
FIG. 2 is a block diagram of a computer system in accordance with one of the preferred embodiments.

Reference is made to FIG. 2 for illustrating a computer system 116, such as an eServer iSeries computer system commercially available from International Business Machines Corporation, Armonk, N.Y. It will be appreciated that other computer systems are envisioned for use in implementing the present invention and that the illustrated embodiment is exemplary of but one. The computer system 116 comprises one or more processors 130 a-n (collectively, 130) that are connected to a main memory 140, a mass storage interface 150, a display interface 160, a network interface 170, and a plurality of I/O slots 180. A system bus 125 interconnects these components. Although only a single bus is illustrated, those skilled in the art will appreciate that the present invention may utilize multiple buses. Each one of the processors may be constructed from one or more microprocessors and/or integrated circuits. The processors execute program instructions in the main memory. The mass storage interface 150 is utilized to connect to mass storage devices, such as a direct access storage device (DASD) 155, for example a suitable CD RW drive, to a computer system. The display interface 160 is utilized to directly connect one or more displays 165 to the computer system 116. The displays 165 may be non-intelligent terminals or fully programmable workstations. The network interface 170 is utilized to connect other computer systems and/or workstations 175 to computer system 116 across a network. It is pointed out that the present invention applies no matter how many computer systems and/or workstations may be connected to other computer systems and/or workstations, regardless of the network connection technology that is utilized.

The main memory 140 contains data 141 that may be read or written by any of the processors 130 or any other device that may access the main memory. The main memory 140 may include an operating system 142, and a resource scheduling manager 143. The main memory 140 stores programs and data that the processor may access and execute. The operating system 142 is a multitasking operating system, such as OS/400™, AIX™, Linux™, or other suitable kind. Those skilled in the art will appreciate that the spirit and scope of the present invention is not limited to any one operating system.

The resource scheduling manager 143 dynamically manages the access to additional computer resources based on determining if valuations of each of the work items of a program being processed exceed the estimated costs to process such work items. Accordingly, managing the allocation of computer resources is based on a determination of when it makes economic sense to pay for additional computer resources. For example in this embodiment, batch jobs are received by the scheduling manager 143. A batch job could be the running of an application program, such as insurance claims, or the like. In one embodiment, the insurance claims can be listed in a table of the database, such as the exemplary database table shown in Table I below. The operating system 142 manages the resources of the computer system including the processors 130, main memory 140, mass storage interface 150, display interface 160, network interface 170, and I/O slots 180. The operating system 142 includes applications for operating the system. Included in the memory is the resource scheduling manager 143 which may reside in main memory 140, or, as is known, may reside elsewhere.

TABLE I

EXEMPLARY DATABASE TABLE FOR INSURANCE CLAIMS

| Work Item ID | Creation Date | CPT-4 code | Insurance Company | Bill Total |
|---|---|---|---|---|
| 1 | Jan. 15, 2004 | 28457 | A Co. | $1034.65 |
| 2 | Jan. 15, 2004 | 74367 | B Co. | $762.56 |
| 3 | Jan. 17, 2004 | 43879 | C Co. | $64.16 |
| 4 | Jan. 18, 2004 | 43792 | B Co. | $9231.32 |
| 5 | Jan. 20, 2004 | 19442 | C Co. | $731.45 |
| 6 | Jan. 20, 2004 | 93243 | A Co. | $156.83 |
| 7 | Jan. 22, 2004 | 39526 | A Co. | $276.45 |
| 8 | Jan. 23, 2004 | 72364 | C Co. | $1536.82 |
| 9 | Jan. 23, 2004 | 95534 | B Co. | $125.23 |
| 10 | Jan. 23, 2004 | 24789 | C Co. | $643.67 |

As can be seen from Table I, it illustratively contains a listing of the insurance work items or units. Each of the work items include data information pertaining to a number of factors associated with it. For example, each has: an appropriate identification number, each has a claim creation date, each has a CPT-4 code, an insurance company name, and the amount of the total bill. The CPT-4 code is used as an input to an industry specific heuristic that provides valuation to particular insurance bills. The code reflects that certain insurance claims are valued differently than others. Clearly, the invention envisions that a wide variety of heuristics can be utilized for establishing financial valuations. This application to not only health related insurance claims, but for other kinds of data processing as well. As will be described, the foregoing information is used for defining the financial values attributed to each of the work items. Such valuations are then compared to the processing costs for each of the work items as will be explained.

Included in the resource scheduling manager 143 is a monitoring module or mechanism 144 for monitoring aspects of each entry received from a batch queue. A sorting module or mechanism 145 is provided for sorting and listing each entry from, for example, highest to lowest financial benefit or valuation (see FIG. 7A). A resource allocation module or mechanism 146 is provided that dynamically apportions computer resources, as appropriate, for processing the work items according to their financial valuations relative to processing costs. In particular, if there is enough in-house processing capacity to process the sorted list, the entire list is processed during a batch window. Alternatively, if there is insufficient in-house computing capacity to complete processing within a batch window, the resources allocation module 146 processes that portion of the list with the available in-house or grid processing capacity. Each of the remaining unprocessed work items are then compared in terms of weighing their processing costs to their financial benefit or valuations. If their processing cost outweighs their financial benefit or valuation, processing is delayed until subsequent batch windows. Subsequently, these comparisons are repeated. Alternatively, if their financial benefit or valuations outweigh their processing costs, the work items are processed by purchasing additional capacity as through the grid manager 108 or through the partition manager 240. Generally in regard to batch files, the processing costs for each work item can be easily estimated by suitable procedures. If needed, additional logic can be used to estimate the cost to process each input work item. Other known methods for determining processing costs may be used, such as historical data. As such, the resources allocation module apportions the computer resources, as appropriate, for having the work items processed according to their valuation attributes. The resources allocation module 146 also includes a priority algorithm which acts to prevent starvation of processing capacity for work items that are delayed as noted above. As a result, all work items of a batch file will be processed regardless of their valuations relative to processing costs.

A prediction computer resource metering mechanism or module 147 is provided for use in determining fees or costs based on projected utilization of computer resources according to the attributes. Accordingly, a fee-based process based on the projected utilization of computer resources for completing a batch program is enabled, whereby costs or fees to be charged to the user are based on projected utilization of computer resources to finish the batch program. A batch history module or mechanism 148 is provided which creates history tables for new jobs and which updates history tables for known batch programs or costs associated with the particular batch programs.

Figure 3:
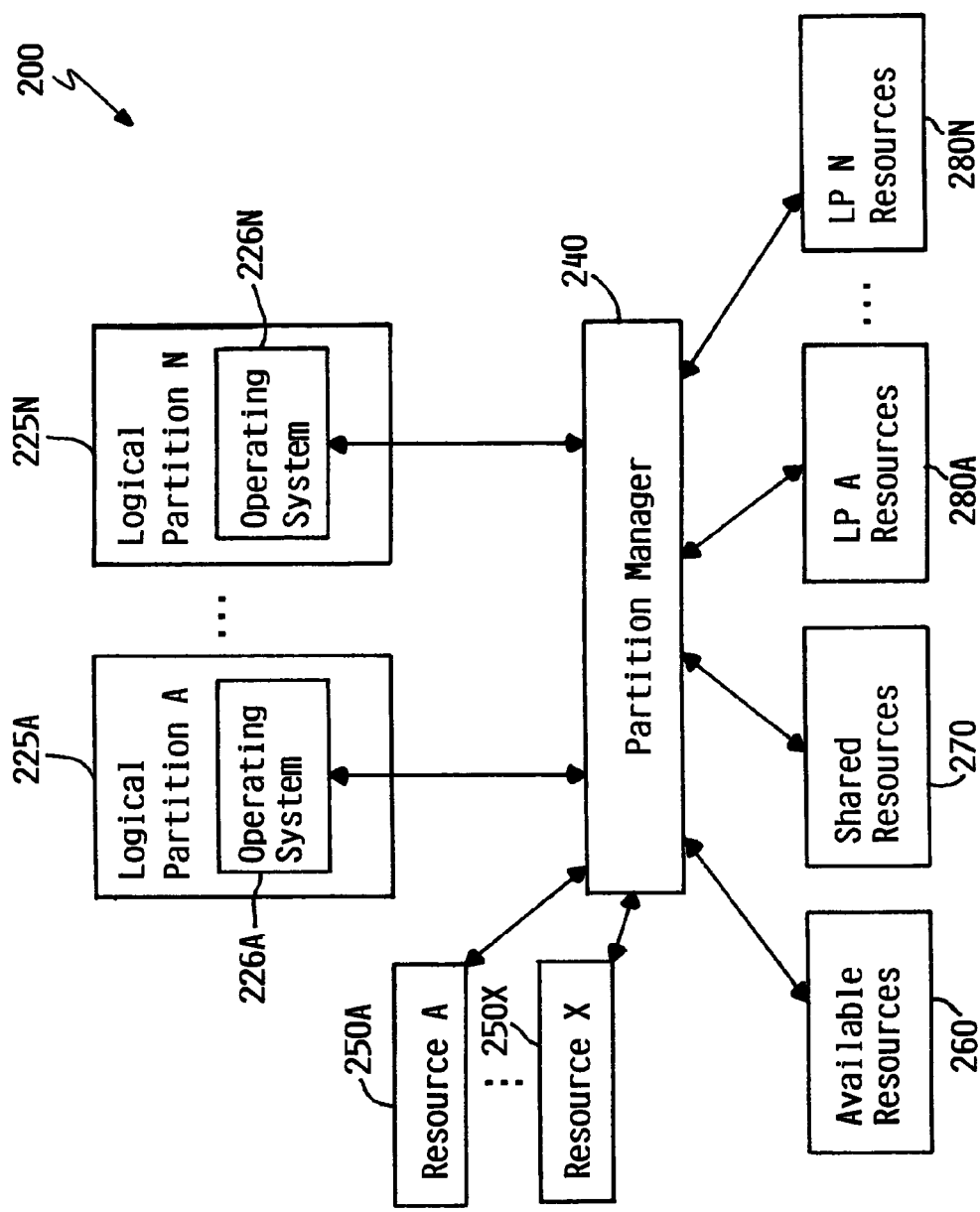
FIG. 3 is a block diagram of a computer system in accordance with one of the preferred embodiments of the present invention.

Referring to FIG. 3, one specific implementation of a logically partitioned computer system 200 includes N logical partitions, with each logical partition executing its own respective operating system 226. In FIG. 3, logical partitions $225_{A-N}$ (collectively 225) are shown executing their respective operating systems $226_{A-N}$ (collectively 226). The operating system 226 in each logical partition may be the same as the operating system in other partitions, or may be a completely different operating system. Thus, one partition may run the OS/400 operating system, while a different partition may run another instance of OS/400, possibly a different release. The operating systems in the logical partitions could even be different from OS/400, provided it is compatible with the hardware. The logical partitions 225 are managed by a partition manager 240. One example of suitable partition manager 240 is known as a "Hypervisor" which is commercially available from International Business Machine Corporation. The partition manager 240 manages resources 250, shown in FIG. 3 as resource 250. As used in the present application, a "resource" may be any hardware or software or combination thereof that may be controlled by partition manager 240. Examples of hardware resources include without limitations processors, memory, and hard disk drives. Examples of software resources include a database, internal communications (such as a logical LAN), or applications (such as word processors, e-mail, etc.). The partition manager 240 controls which resources 250 may be allocated to the logical partitions 225. The partition manager 240 is adapted to be responsive to the resources scheduling mechanism or module 146 (see FIG. 3) so as to identify which additional resources, if any, should be applied. A resource, once made available to the partition manager 240, is categorized as an available resource 260 if it has not yet been assigned to a logical partition, is categorized as a shared resource 270 if multiple logical partitions may access the resource, and is categorized as a dedicated resource $280_{A-N}$ (collectively 280) if it has been exclusively assigned to a logical partition.

Figure 4:
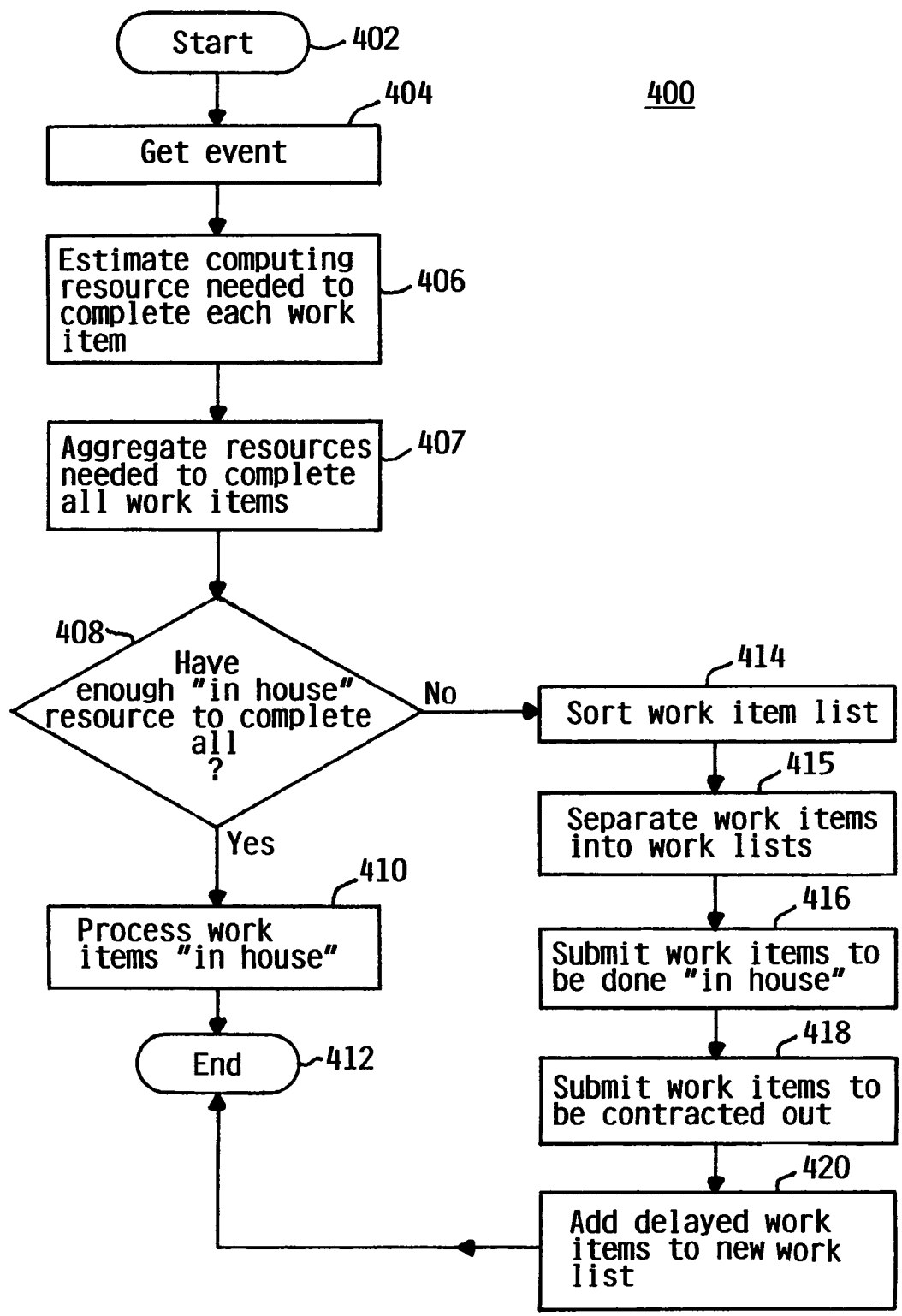
FIG. 4 represents an exemplary flow diagram illustrating one aspect of the present invention.

Reference is made to FIG. 4 for illustrating the exemplary process of a value based resource scheduling method 400. The resource scheduling method 400 is operable for selectively utilizing computer resources on batch programs or other long-running programs so that they may be processed in an expeditious manner according to value attributes associated with the batch programs. These processes are essentially implemented by the data processing system 100 and the scheduling mechanism 146.

Significantly, the resource scheduling method 400 enables customers to apportion processing consistent with the valuations or financial benefits of the work items or work units of the batch program relative to their processing costs. Preferably, the implementation of the resource scheduling method 400 occurs prior to running the batch programs. As generally referred to herein in the specification and claims, the term(s), work item, work job, or work unit is one of a series of tasks performed by a program or programs in a data processing environment that can be done independently, and/or in parallel to other data processes.

The resource scheduling method 400 commences at the Start block 402 and proceeds to a Get Event block 404. In the Get Event block 404, a batch file or other long-running program, for example, may be processed. In an Estimate Computing Resources block 406 that follows, the resource scheduling mechanism calculates an estimate of the computing resources needed to complete processing of each of the work items of the batch program and the results are placed in column 720 of the work item list 700 (FIG. 7A). The work item sorting list or table 700 comprises a work item identification column 710 which identifies each work item; a computing resources estimate column 720 which lists the computing resources estimates for processing each of the work items as calculated from the scheduling mechanism; a cost to process column 730 which list the predefined or contracted processing costs that are associated with processing each work item in house; and a valuation column 740 that lists the valuations or financial benefits of each work. The valuations listed in column 740 are the products of the respective columns 720 and 730 as modified by the valuation heuristic of the CPT-4. A cut-off date column 750 is provided which lists the dates in the future by which each of the work items should be completed.

An Aggregate Computing Resources block 407 follows Estimate Computing Resources block 406, in which the individual work item resource processing estimates listed in FIG. 7A, column 720 aggregated into a single total by the sorting module 145. After performing the Aggregate Computing Resources block 407, then the Have Enough In-house Resources decision block 408 is performed. In the Have Enough In-house Resources decision block 408, a determination is made by the resource allocating module 146 as to whether the computer resources of the local computer system 102 may be sufficient for completing all the work items of the batch program in a batch window or other estimated time period. The estimated time period may be configured by a system user or by the system when the batch process is initiated, as is known. If the decision in the Have Enough In-house Resources decision block 408 is Yes, then the In-house Processing block 410 follows. As a result, all the work items may be processed in a known manner by the local or in-house computer system. Following the In-house Processing block 410, the resource scheduling method 400 terminates in the End block 412. At this point there is nothing in the batch queue to sort. Alternatively, if the determination of the Have Enough In-house Resources decision block 408 is No, then the resource scheduling method 400 proceeds to a Sorting Work Item List block 414.

Figure 5:
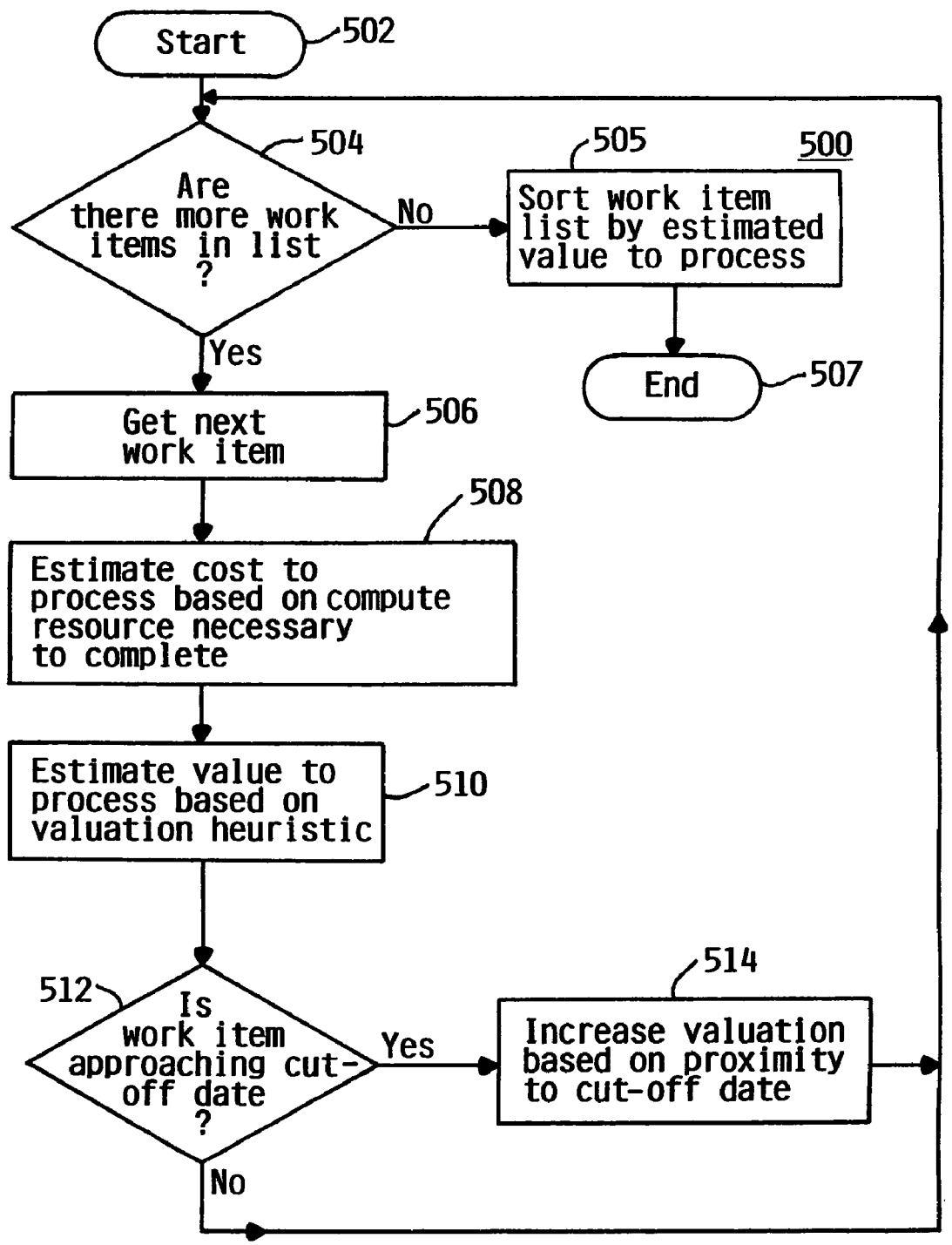
FIG. 5 represents an exemplary flow diagram illustrating another aspect of the present invention.

Reference is made to FIG. 5 for illustrating exemplary steps of A Work Item Value Sorting Routine 500 that is performed in carrying out the step in the Sorting Work Items List block 414. This routine is performed by allocation module 146. Operation of the value sorting routine 500 commences in the Start block 502. This is followed by an Are There More Work Items in List decision block 504. This generally occurs when considering if a batch queue has any work items that are left in the queue to process. If the decision in the Are There More Work Items block 504 is No, then the Sort Work Items by estimated value to process is performed in block 505. The estimated valuation is performed by the valuation heuristic as noted above. The process proceeds to the End block 507, whereby the next step performed is the Separate Work Items into different processing lists 415 (FIG. 4). Alternatively, if the decision is Yes, then a Get Next Work Item block 506 follows.

In the Get Next Work Item block 506, successive work item entries from FIG. 7A are retrieved. Preferably, the Estimating Cost to Process block 508 follows. In the Estimating Cost to Process block 508 an algorithm or other process may be applied to estimate the costs of in-house or contract out processing for completing each work item. This cost to process may be obtained, as noted earlier, by known methodologies. For example, this cost to process may be determined by comparing to the costs of previously run work items with similar resource requirements, by comparing the resource needs to a grid provider's contract, by submitting the resource needs request to a grid provider in order to get a price estimate, or by other comparisons. In the Estimate Cost to Process block 508, the cost to process each work item is recorded in the cost to process column 730 in FIG. 7A.

Following block 508 is An Estimate Value or financial benefit block 510. In the Estimate Value block 510 an estimation of valuation or financial benefit for each work item is performed. Such estimation is based on operation a valuation heuristic algorithm, such as one using the CPT-4 code. As noted, other valuation heuristic algorithms that would be appropriated may be used. The valuation or financial benefit of each work item is recorded in the valuation column 740 of the work item list 700, FIG. 7A. As noted above in the health care industry, the estimated valuation of each work item may be based on a combination of factors. These factors may include the total bill, the type of insurance company used (prefer private companies because the payout is better), delay in-house insurance the longest, CPT-4 insurance code, past payment/delinquency amount.

Next Is Work Item approaching a cut-off date decision block 512 is performed in which a decision is made as to whether the work items are approaching their program cut-off dates, as is illustrated in column 750 (FIG. 7A) of the work item list 700. A program cut-off date is one in which the system user would lose benefits if the work item were not processed by or before such date. If the decision in the block 512 is Yes, then an Increase Valuation block 514 follows. In the Increase Valuation block 514, a priority algorithm of the allocation module 146 is utilized to increase the valuation of each work item as the proximity to the cut-off date approaches. For example, the work item valuation may increase by 1000% in order to get the work item processed by or before the cut-off date. In this manner, all work items of a batch file will be processed. Thereafter, the Are There More Work Items in List block 504 follows until no more work items are present. Thereafter, the process returns to Work Assignment block 415 through the End block 507.

In the Work Item Assignment block 415, a determination is made by the allocation mechanism 146 about which work items to contract out for additional or purchased processing (i.e., seek additional processing), or which work items to delay processing until their valuation exceeds the cost of processing. The additional processing for contracting out may be any other suitable computer resources that may be available through the grid, or through additional partitions in a logically partitioned environment or other suitable environment. The additional processing would be requested if inadequate computer resources were not available from the local computer system 102. A delay decision would be warranted if the particular work item(s) need not be processed until some future date. Therefore, the priority algorithm could post the cut-off date for up to 30 days.

Figure 6:
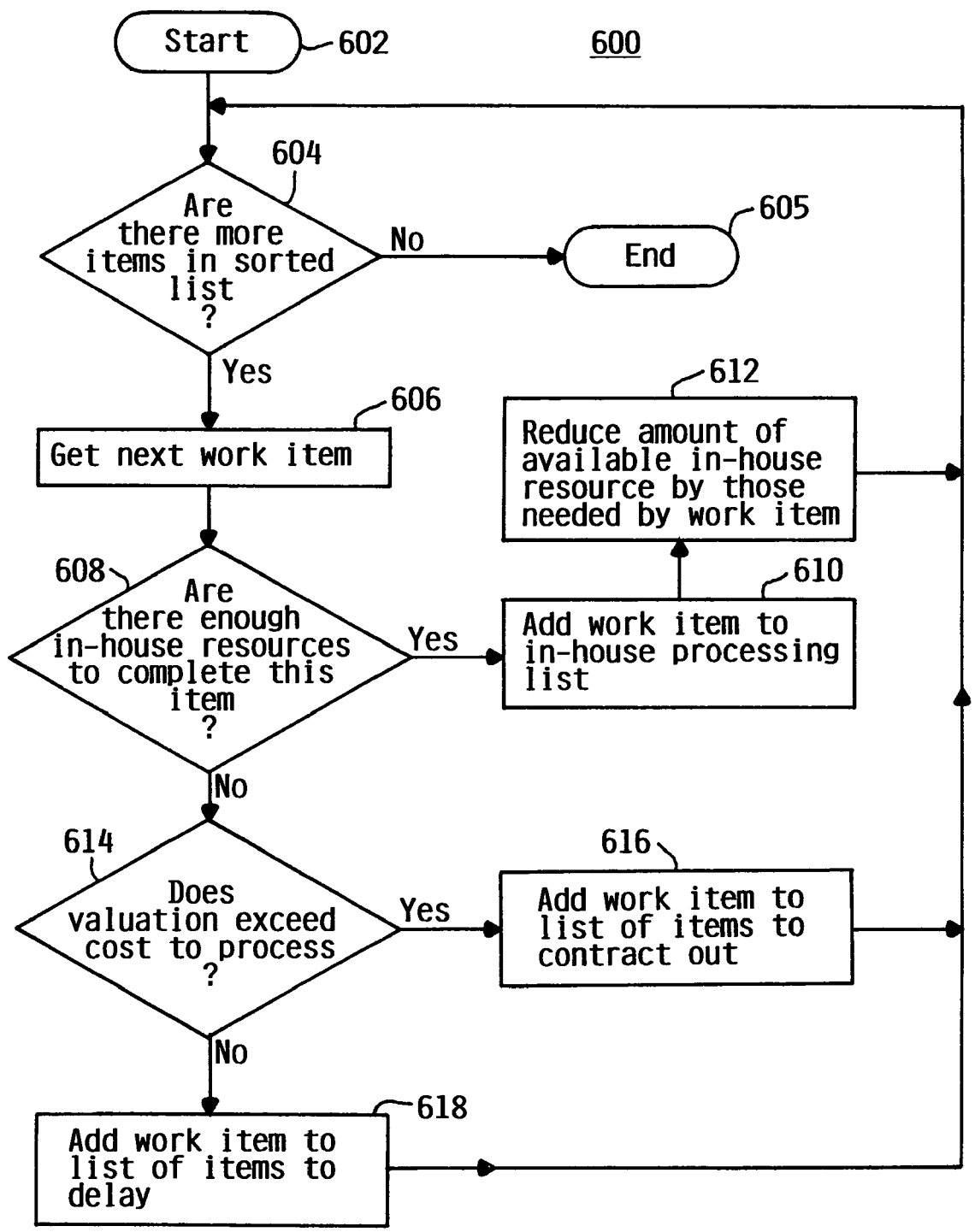
FIG. 6 represents an exemplary flow diagram illustrating still another aspect of the present invention.
Figure 7B:
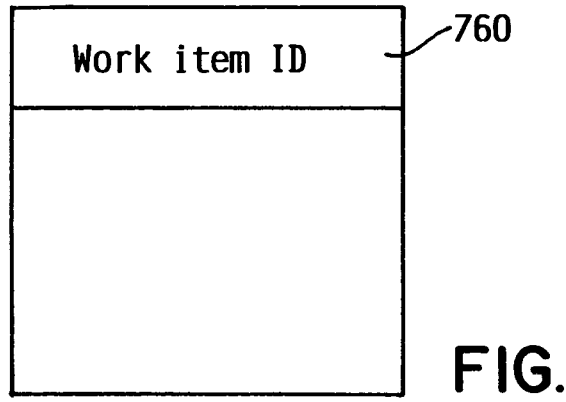
Figure 7C:
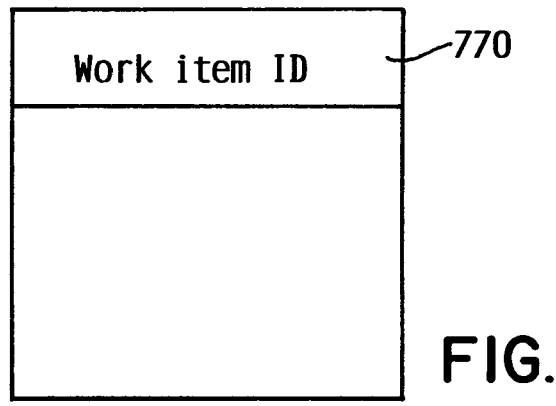
Figure 7D:
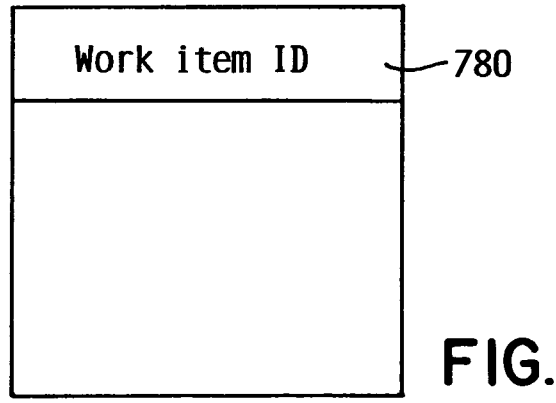

Reference is now made to FIG. 6 for illustrating exemplary blocks of a Work Item Separating or Sorting Routine 600 that is performed in carrying out the steps of Separating Work Items Into Work Lists in block 415. Operation of the Work Item Separating or Sorting Routine 600 commences in the Start block 602 and is followed by an Are There More Items In the Sorted List step in decision block 604. If the determination of the Sorted List decision block 604 is negative (i.e., No), then the work item list is complete and an End block 605 follows. In the End block 605, the Work Item Separating Routine 600 terminates. However, should the determination in the Sorted List decision block 604 be positive (i.e., Yes), then a next work item is taken from the batch queue in a Get Next Work Item block 606. Following the Get Next Work Item block 606 there is performed an Are There Enough In-house Resources to Complete this Item decision block 608. If the determination in the Are There Enough In-house Resources to Complete this Item block 608 is Yes, then an Add Work Item to In-house Processing List block 610 is performed. As such, a work item is added to the in-house processing list 760, as illustrated in FIG. 7B. Thereafter, a resource reduction block 612 follows which serves to reduce the amount of available in-house resources for processing the batch program which is commensurate with the reduction, whenever the job is processed. This Work Item Sorting Routine 600 is returned to the Are There More Items In the Sorted List decision block 604 for continued processing until there are no more items listed. Referring back to the Are There Enough In-house Resources block 608, if the decision is No, then a Does Valuation Exceed Cost to Processing block 614 follows. In this decision making process, if the determination is Yes, then the work item is added to the work item list 770 (FIG. 7C). The determination is Yes when the value of processing needed for that particular work item exceeds the estimated processing costs. Alternatively, if the valuation decision of the block 614 is No, then the work item is added to a delay list as indicated in the delay list 780 (FIG. 7D) in the Adding Work Item to List block 618. As such, the Work Item Separating Routine 600 returns to the block 604 for further evaluation. Once the work item list is processed to completion, the Work Item Separating Routine 600 returns to block 416.

Now, reference is made back to FIG. 4, whereupon in the Submit Work Items to In-house Processing block 416 that follows block 415, the work items to be processed in-house are processed by the local computer system. Thereafter, in the Submit Work Items to Contracted Out resources block 418, the process submits the work items to be contracted out because the in-house processing cannot perform the processing and their valuation exceeds the cost of processing. Finally, in the Delay block 420, work items that are delayed are added to a new work list according to the priority algorithm. Accordingly, these work items will be evaluated again when the next batch window is available for processing until the processing is performed, whereby the batch file is completely processed. Following the process in the Delay block 420, the process proceeds to the End block 412, whereby the overall batch file is terminated. As such an evaluation of when it makes economic sense to process is made, whereby the timings of when the work items are processed are based on whether the financial valuations of each of the work items exceed their respective processing costs. Any delays in processing, such as when the processing costs exceed the financial benefits of the work items are prioritized. The prioritization avoids starvation of resources to work items, whereby all the work items of a batch file can be completely processed before or by cut-off dates.

It will, therefore, be appreciated that the present invention provides an improved system, and method of dynamically determining the allocation of computer resources to be applied to a program based on different attributes of a program that is to be processed. This is especially the case when there are dynamic determinations made about the allocation of the computer resources based on different attributes of the one or more work items forming at least part of a program. A fee-based process based on the projected utilization of computer resources for completing a batch program is enabled by the resource metering module, whereby costs or fees to be charged to the user are based on projected utilization of computer resources to finish the batch program.

One aspect of the invention is implemented as a program product for use with a computer system or environment. The program(s) of the program product defines functions of the embodiments (including the methods described herein) and may be contained on a variety of signal-bearing media. Illustrative signal-bearing media include, but are not limited to: (i) information permanently stored on non-writable storage media (e.g., read-only memory devices generally within a computer such as CD-ROM disks readable by a CD-ROM drive); (ii) alterable information stored on writable storage media (e.g., floppy disks generally within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature utilized is merely for convenience. Thus, the invention should not be limited to use solely in any specific application identified and/or implied by such nomenclature.

The embodiments and examples set forth herein were presented to explain best the present invention and its practical applications, thereby enabling those skilled in the art to make and use the invention. However, those skilled in the art will recognize that the foregoing description and examples have been presented for the purposes of illustration and example only. The description set forth is not intended to be exhaustive or to limit the invention to the precise forms disclosed. In describing the above-exemplary embodiments illustrated in the drawings, specific terminology has been utilized for the sake of clarity. However, the invention is not intended to be limited to the specific terms selected. It is to be understood that each specific term includes all technical equivalents that operate in a similar manner to accomplish a similar purpose. Many modifications and variations are possible in light of the above teachings without departing from the spirit and scope of the appended claims.

What is claimed is:

1. A computer-implemented method for managing access to computer resources, the method comprising:
   (a) defining a respective financial valuation of each of a plurality of work items to be processed by one or more data processing systems;
   (b) comparing the respective financial valuation of each respective said work item to a respective cost of accessing additional computer resources necessary to process the work item in a current time period, said additional computer resources being external to said one or more data processing systems;
   (c) with respect to each said work item for which the respective financial valuation of the work item exceeds the respective cost of accessing additional computer resources necessary to process the work item in the current time period, dynamically accessing additional computer resources necessary to process the work item in the current time period;
   (d) with respect to each said work item for which the respective financial valuation of the work item does not exceed the respective cost of accessing additional computer resources necessary to process the work item in the current time period, deferring processing of the work item to a subsequent time period; and
   (e) repeating said (b) through (d) in one or more subsequent time periods with respect to each said work item deferred by said (d) until each said work item has been processed.

2. The method of claim 1 further comprising applying a valuation heuristic to each work item.

3. The method of claim 1 further comprising applying a priority algorithm for preventing starvation of computer resources to those work items which have been delayed, whereby the processing of all the work items in a program is completed.

4. The method of claim 2 further comprising having the priority algorithm increase respective valuations of delayed work items so as to complete processing of each of the work items prior to or at a cut-off processing date of the work item.

5. The method of claim 1, wherein said method is used in a networked environment including a grid of computing resources, and a request manager of the grid to receive requests of one or more customers for utilization of computing resources of the grid; wherein said additional computer resources comprise computing resources of said grid of computing resources; wherein one or more computer systems of a customer is coupled to the request manager and include one or more processors; a memory coupled to at least the one processor; and, a scheduling manager residing in the memory and executable by the at least the one processor.

6. A method of providing fee-based processing for programs in a processor system, whereby fees are based on utilization of computer resources for completing processing a program, the processor system including at least one processor; a memory coupled to the at least one processor, and a scheduling manager residing in the memory, the method comprising the steps of:
   (a) defining a respective financial valuation of each of a plurality of programs to be processed;
   (b) comparing the respective financial valuation of each respective said program to a respective projected fee for utilization of computer resources to process said program in a current time period;
   (c) with respect to each said program for which the respective financial valuation of the program exceeds the respective projected fee for utilization of computer resources to process the program in the current time period, dynamically accessing computer resources to be applied to process the program in the current time period;
   (d) with respect to each said program for which the respective financial valuation of the program does not exceed the respective projected fee for utilization of computer resources to process the program in the current time period, deferring processing of the program to a subsequent time period; and
   (e) repeating said (b) through (d) in one or more subsequent time periods with respect to each said program deferred by said (d) until each said program has been processed; and
   (f) assessing a fee for the dynamically accessed computer resources to be used.

7. The method of claim 6 further comprising applying a valuation heuristic to each work item for establishing the valuation of each work item.

8. The method of claim 7 further comprising applying a priority algorithm for preventing starvation of computer resources to those work items which have been delayed, whereby the processing of all the work items in a program is completed.

9. The method of claim 8 wherein the dynamic determination is based on different attributes of the one or more work items forming at least part of a program.

10. A data processing apparatus comprising:
   at least one processor;
   a memory coupled to the at least one processor; and
   a scheduling manager residing in the memory and executable on the at least one processor, the scheduling manager dynamically managing access of each of a plurality of work items to additional computer resources external to said data processing apparatus for processing the respective work item, each said work item being a respective item of work performable by a data processing system and having a respective financial valuation;
   wherein said scheduling manager, in each of a plurality of time periods, compares the respective financial valuation of each unprocessed work item to a respective cost of accessing said additional computer resources to process the work item in the respective time period, and with respect to each said work item for which the respective financial valuation exceeds the respective cost of accessing the additional computer resources to process the work item in the respective time period, dynamically accesses the additional computer resources to process the work item in the respective time period; and with respect to each said work item for which the respective financial valuation does not exceed the respective cost of accessing the additional computer resources to process the work item in the respective time period, defers processing of the work time to a subsequent time period.

11. The apparatus of claim 10 wherein the scheduling manager applies a valuation heuristic to each work item.

12. The apparatus of claim 10 wherein the scheduling manager applies a priority algorithm for preventing starvation of computer resources to those work items which have been deferred, whereby the processing of all the work items is completed.

13. The apparatus of claim 12 wherein the priority algorithm increases respective valuations of delayed work items so as to complete processing of each of the work items prior to or at a cut-off processing date of the work item.

14. A program product comprising:
   a scheduling manager embodied as a plurality of computer-executable instructions recorded on a computer-readable storage medium, wherein said scheduling manager, when executed by a computer system, causes the computer system to:
   (a) compare a respective defined financial valuation of each of a plurality of work items to be processed by the computer system to a respective cost of accessing additional computer resources necessary to process the work item in a current time period, said additional computer resources being external to said computer system;
   (b) with respect to each said work item for which the respective financial valuation of the work item exceeds the respective cost of accessing additional computer resources necessary to process the work item in the current time period, dynamically accesses additional computer resources necessary to process the work item in the current time period;
   (c) with respect to each said work item for which the respective financial valuation of the work item does not exceed the respective cost of accessing additional computer resources necessary to process the work item in the current time period, defers processing of the work item to a subsequent time period; and
   (d) repeats said (a) through (c) in one or more subsequent time periods with respect to each said work item deferred by said (c) until each said work item has been processed.

15. The program product of claim 14 wherein the scheduling manager applies a valuation heuristic to each work item to establish a valuation for each of the work items.

16. The program product of claim 14 wherein the scheduling manager applies a priority algorithm for preventing starvation of computer resources to those work items which have been delayed, whereby the processing of all the work items in a program will be completed.

17. The program product of claim 16 wherein the priority algorithm increases respective valuations of delayed work items so as to complete processing of each of the work items prior to or at a cut-off processing date of the work item.

18. A networked environment, comprising:
   a grid of computing resources;
   a request manager of the grid to receive requests of one or more customers for utilization of computing resources of the grid;
   one or more computer systems of a customer coupled to the request manager; the one computer system comprising one or more processors;
   a memory coupled to at least the one processor of the one computer system; and,
   a scheduling manager residing in the memory and executable on the at least one processor, the scheduling manager dynamically managing access of each of a plurality of work items to additional computer resources external to said one or more computer systems of a customer for processing the respective work item, each said work item being an item of work performable by a data processing system and having a respective financial valuation;
   wherein said scheduling manager, in each of a plurality of time periods, compares the respective financial valuation of each unprocessed work item to a respective cost of accessing said additional computer resources to process the work item in the respective time period, and with respect to each said work item for which the respective financial valuation exceeds the respective cost of accessing the additional computer resources to process the work item in the respective time period, dynamically accesses the additional computer resources to process the work item in the respective time period; and with respect to each said work item for which the respective financial valuation does not exceed the respective cost of accessing the additional computer resources to process the work item in the respective time period, defers processing of the work time to a subsequent time period.

19. The environment of claim 18 wherein the scheduling manager applies a valuation heuristic to each work item.

20. The environment of claim 18 wherein the scheduling manager applies a priority algorithm for preventing starvation of computer resources to those work items which have been delayed, whereby the processing of all the work items in a program is completed.

21. The environment of claim 20 wherein the scheduling manager increases respective valuations of delayed work items so as to complete processing of each of the work items prior to or at a cut-off processing date of the work item.

22. A computer-implemented method for managing access to computer resources, the method comprising:

(a) providing a plurality of work items for processing by one or more data processing systems in a current time period, each work item having a respective financial valuation;

(b) selecting a first subset of said plurality of work items for processing by a first data processing system in the current time period according to said financial valuations;

(c) with respect to each said work item not included in said first subset, comparing the respective financial valuation of the work item to a respective cost of accessing additional computer resources external to said first data processing system to process the work item in the current time period;

(d) with respect to each said work item not included in said first subset for which the respective financial valuation of the work item exceeds the respective cost of accessing additional computer resources external to said first data processing system to process the work item in the current time period, dynamically accessing additional computer resources external to said first data processing system to process the work item in the current time period;

(e) with respect to each said work item not included in said first subset for which the respective financial valuation of the work item does not exceed the respective cost of accessing additional computer resources external to said first data processing system to process the work item in the current time period, deferring processing of the work item to a subsequent time period; and (f) repeating said (a) through (e) in multiple time periods, wherein any work item deferred by (e) is included in the plurality of work items of each subsequent time period until the work item is processed, and wherein for at least some time periods, the first subset of the respective plurality of work items includes fewer than all of the respective plurality of work items.

23. The method of claim 22 further comprising applying a priority algorithm for preventing starvation of computer resources to those work items which have been deferred, whereby the processing of all the work items is completed.

24. The method of claim 22, wherein said method is used in a networked environment including a grid of computing resources, and a request manager of the grid to receive requests of one or more customers for utilization of computing resources of the grid; wherein said additional computer resources comprise computing resources of said grid of computing resources.

* * * * *